United States Patent
Doessel et al.

(10) Patent No.: US 10,358,552 B2
(45) Date of Patent: Jul. 23, 2019

(54) IMPACT-RESISTANT MOLDING MATERIAL HAVING AN IMPROVED CHARACTERISTICS PROFILE

(71) Applicants: Lukas Friedrich Doessel, Darmstadt (DE); Reiner Mueller, Biebesheim (DE); Werner Hoess, Messel (DE); Julian Klitsch, Moerfelden-Walldorf (DE)

(72) Inventors: Lukas Friedrich Doessel, Darmstadt (DE); Reiner Mueller, Biebesheim (DE); Werner Hoess, Messel (DE); Julian Klitsch, Moerfelden-Walldorf (DE)

(73) Assignee: Evonik Röhm GmbH, Darmstadt (DE)

( * ) Notice: Subject to any disclaimer, the term of this patent is extended or adjusted under 35 U.S.C. 154(b) by 41 days.

(21) Appl. No.: 15/513,649

(22) PCT Filed: Sep. 16, 2015

(86) PCT No.: PCT/EP2015/071216
§ 371 (c)(1),
(2) Date: Mar. 23, 2017

(87) PCT Pub. No.: WO2016/046043
PCT Pub. Date: Mar. 31, 2016

(65) Prior Publication Data
US 2017/0298217 A1 Oct. 19, 2017

(30) Foreign Application Priority Data
Sep. 24, 2014 (EP) .................................... 14186197

(51) Int. Cl.
*C08L 33/12* (2006.01)
*C08F 265/06* (2006.01)
*C08F 285/00* (2006.01)
*C08L 51/00* (2006.01)

(52) U.S. Cl.
CPC ............ *C08L 33/12* (2013.01); *C08F 265/06* (2013.01); *C08F 285/00* (2013.01); *C08L 51/00* (2013.01); *C08L 2205/06* (2013.01); *C08L 2207/53* (2013.01)

(58) Field of Classification Search
CPC ............................. C08L 33/12; C08L 2207/53
See application file for complete search history.

(56) References Cited

U.S. PATENT DOCUMENTS

| | | | |
|---|---|---|---|
| 3,793,402 A | 2/1974 | Owens | |
| 4,513,118 A | 4/1985 | Suetterlin et al. | |
| 5,216,082 A | 6/1993 | Heil et al. | |
| 5,270,397 A | 12/1993 | Rhein et al. | |
| 5,726,245 A | 3/1998 | Numrich et al. | |
| 6,172,135 B1 | 1/2001 | Fraser et al. | |
| 6,319,966 B1 | 11/2001 | Kang et al. | |
| 7,695,813 B2 | 4/2010 | Schultes et al. | |
| 8,119,734 B2 | 2/2012 | Schultes et al. | |
| 2003/0125465 A1 | 7/2003 | Koyama et al. | |
| 2005/0148716 A1 | 7/2005 | Sakamoto | |
| 2006/0052515 A1* | 3/2006 | Schultes | C08F 285/00 524/556 |
| 2009/0086319 A1* | 4/2009 | Ahn | C08L 33/08 359/485.01 |
| 2010/0174022 A1* | 7/2010 | Schultes | C08L 33/08 524/391 |
| 2010/0272960 A1* | 10/2010 | Schultes | C08L 33/08 428/156 |
| 2011/0136980 A1 | 6/2011 | Pirra et al. | |
| 2011/0218291 A1 | 9/2011 | Schultes et al. | |

FOREIGN PATENT DOCUMENTS

| | | |
|---|---|---|
| EP | 0 113 924 | 7/1984 |
| EP | 1 350 812 | 10/2003 |
| EP | 1 033 390 B1 | 5/2006 |
| JP | H 09-48922 | 2/1997 |
| JP | 2003-231760 | 8/2003 |
| JP | 2003-313254 | 11/2003 |
| RU | 2 214 921 C1 | 10/2003 |
| RU | 2 330 716 C2 | 8/2008 |
| RU | 2 334 764 C2 | 9/2008 |
| RU | 2 397 998 C2 | 2/2009 |
| WO | 2004/056893 A1 | 7/2004 |
| WO | WO 2012/130595 | 10/2012 |

OTHER PUBLICATIONS

International Search Report dated Nov. 17, 2015 in PCT/EP2015/071216 filed Sep. 16, 2015.
European Search Report dated Apr. 2, 2015 in European Application 14186197.1 filed Sep. 24, 2014.
Combined Russian Office Action and Search Report dated Apr. 3, 2018 in Russian Patent Application No. 2017109123/04 (submitting English translation only), 5 pages.
U.S. Appl. No. 9,988,548, filed Jun. 5, 2018, U.S. Pat. No. 2015-0376437, Werner Hoess et al.
U.S. Appl. No. 15/513,649, filed Oct. 19, 2017, U.S. Pat. No. 2017-0298217, Lukas Friedrich Doessel et al.
David I. Johnson et al. "Refractive index and thermos-optic coefficient of composite polymers at 1.55 µm" Proc. of SPIE, vol. 6038, 603821-1 (2006).
"Standard Test Method for Index of Refraction of Transparent Organic Plastics" Norm ASTM D542-14 (2014).

(Continued)

*Primary Examiner* — Mark S Kaucher
(74) *Attorney, Agent, or Firm* — Oblon, McClelland, Maier & Neustadt, L.L.P.

(57) ABSTRACT

The invention relates to an impact-modified molding composition, especially impact-modified PMMA, having an improved profile of properties, especially also at elevated temperatures, to molded articles obtainable therefrom and to the use of the molding composition and the molded article.

14 Claims, No Drawings

(56) References Cited

OTHER PUBLICATIONS

"Plastics- Determination of Charpy impact strength" ISO 179, Second Edition (May 5, 1993).
General Data PMMA (Total 2 pages).
"Sales Range Molding Compounds" Evonik, 2013 (Total 16 pages).
Plexiglas Datasheet zk5BR—Evonik, 2013 (Page 1 to 3).
Physical Properties of Parapet—KURARAY (Total 2 pages).
Altuglas Resins (Brochure, 5 pages).
Properties of Delpet—AsahiKasei (1 page).

* cited by examiner

IMPACT-RESISTANT MOLDING MATERIAL HAVING AN IMPROVED CHARACTERISTICS PROFILE

The invention relates to impact-modified moulding compositions, especially impact-modified PMMA, having an improved profile of properties (including good optical properties), to moulded articles obtainable therefrom and to the use of the moulding composition and the moulded article.

It is known that the impact resistance of moulding compositions, especially of poly(meth)acrylate moulding compositions, can be improved by adding a suitable amount of what are called impact modifiers to the moulding composition. It has become established practice in industry to use impact modifiers produced by emulsion polymerization, known as core-shell particles and/or core-shell-shell particles. These generally have an elastomeric phase, the elastomeric phase usually being the core in a core-shell structure and usually being the first shell grafted onto the core in a core-shell-shell structure.

For example, U.S. Pat. No. 3,793,402 discloses impact-modified moulding compositions, especially based on poly(meth)acrylate, having 4% to 90% of a multistage core-shell-shell particle having a hard core, an elastomeric first shell and a hard second shell. Typical main constituents of the core and the second shell are alkyl methacrylates having 1 to 4 carbon atoms in the alkyl radical, especially methyl methacrylate. The first shell is formed essentially from butadiene, substituted butadienes and/or alkyl acrylates having 1 to 8 carbon atoms in the alkyl radical. However, it may also contain 0% to 49.9% by weight, especially 0.5% to 30% by weight, of copolymerizable monomer units, for example copolymerizable, monoethylenically unsaturated monomer units According to U.S. Pat. No. 3,793,402, the presence of 10% to 25% by weight of copolymerizable, monoethylenically unsaturated monomer units, especially of styrene, is very particularly advantageous.

The core-shell-shell particles are produced by multistage emulsion polymerization, using thermal initiators such as persulphates or redox initiator systems. Said polymerization is to be effected at a temperature in the range from 0 to 125° C., especially in the range from 30 to 95° C.

Similarly, German patent application DE 41 21 652 A1 discloses impact modifiers for thermoplastic polymers, such as polymethylmethacrylate, consisting of an at least triphasic emulsion polymer comprising A) a hard core composed of a crosslinked homo- or copolymer of ethylenically unsaturated, free-radically polymerizable monomers;
B) an elastomer phase which has been produced in the presence of the core material, has a glass transition temperature not exceeding 10° C. and has been formed from
a) an alkyl ester of acrylic acid having 1 to 8 carbon atoms in the alkyl radical;
b) at least one crosslinking comonomer having two or more polymerizable double bonds in the molecule;
c) arylalkyl acrylate or methacrylate;
d) a hard phase which has been produced in the presence of the elastomer phase and is composed of a homo- or copolymer of ethylenically unsaturated, free-radically polymerizable monomers having a glass transition temperature of at least 50° C.

A moulding composition cited by way of example in this publication DE 41 21 652 A1 (Example 3) has an Izod notched impact resistance of 6.2 kJ/m² at room temperature, of 4.7 kJ/m² at −10° C. and of 3.7 kJ/m² at −20° C. The Vicat softening temperature of the moulding composition is 97° C.

The core-shell-shell particles are likewise produced by means of multistage emulsion polymerization, using alkali metal peroxodisulphate or ammonium peroxodisulphate as initiator and conducting the polymerization at a temperature in the range from 20 to 100° C., for example at 50° C.

German patent application DE 41 36 993 A1 discloses impact-modified moulding compositions comprising 10% to 96% by weight of a polymer based on polymethylmethacrylate and 4% to 90% by weight of a multistage core-shell-shell particle, using a monomer mixture comprising essentially methyl methacrylate for the production of the core and of the second shell. The monomer mixture for the first shell comprises 60% to 89.99% by weight of alkyl acrylates having 1 to 20 carbon atoms in the alkyl radical and/or cycloalkyl acrylates having 5 to 8 carbon atoms in the cycloalkyl radical and 10% to 39.99% by weight of phenylalkyl acrylates having 1 to 4 carbon atoms in the alkyl radical, and optionally further constituents. The mean particle diameter of the core-shell-shell particles is in the range from 50 to 1000 nm, especially in the range from 150 to 400 nm.

According to this publication, the core-shell-shell particles are obtained by a multistage seed latex process in which ammonium peroxodisulphate or alkali metal peroxodisulphates such as potassium peroxodisulphate, or initiator combination systems, are used as polymerization initiators, where the polymerization temperature in the case of the ammonium or alkali metal peroxodisulphates that are to be activated thermally is to be 50 to 100° C.

European Patent EP 0 828 772 B1 describes the impact modification of poly(meth)acrylates by means of multistage core-shell particles or core-shell-shell particles which consist of a core, a first shell and optionally a second shell and are free of vinylically unsaturated compounds having at least two double bonds of equal reactivity. The core contains a first (meth)acrylic polymer. The first shell includes a polymer having a low glass transition temperature, comprising 0% to 25% by weight, especially 5% to 26% by weight, of a styrenic monomer and 75% to 100% by weight of a (meth)acrylic monomer which forms a homopolymer having a glass transition temperature between −75 and 5° C. Any second shell present contains a second (meth)acrylic polymer which may correspond to or be different from the first (meth)acrylic polymer. The total diameter of the core-shell particles or core-shell-shell particles is in the range from 250 to 320 nm.

The core-shell particles or core-shell-shell particles are produced in turn by multistage emulsion polymerization at 80° C., using a potassium persulphate as initiator.

International patent application WO 2004/056893 describes efficient processes for preparing core-shell particles or core-shell-shell particles. Core-shell particles or core-shell-shell particles having a total radius of 150.0 to 250.0 nm are described as being particularly suitable for impact modification of polyalkyl(meth)acrylate moulding compositions. WO 2004/056893 discloses a process for producing core-shell particles or core-shell-shell particles having a solids content of polymer in the aqueous dispersion exceeding 50% by weight with simultaneously surprisingly low coagulate formation.

The person skilled in the art in the present field of industry is well aware that it is frequently necessary to add amounts of up to 40% by weight of known core-shell-shell particles to a moulding composition base in order to achieve sufficiently high impact resistance. The addition of such high amounts of core-shell-shell particles, however, firstly leads to a lowering of the Vicat softening temperature of the overall moulding composition and secondly increases the melt viscosity. This makes it difficult to utilize such moulding compositions in some fields of use (for example large/thin-walled components in injection moulding). It is thus desirable to the person skilled in the art for a moulding composition to have sufficient heat distortion resistance and for the Vicat softening temperature thus to be sufficiently high, and additionally for a moulding composition to have a sufficiently low melt viscosity, i.e. a high melt volume flow rate, reported as MVR.

In addition, it is a fundamental demand on moulding compositions for products, especially for applications such as glazing, that they have sufficient optical clarity, especially also at elevated temperature. Products having a haze of less than or equal to 3.0%, especially less than or equal to 2.0%, particularly less than or equal to 1.5% and very particularly less than or equal to 1.0%, measured by means of a Hazemeter BYK Gardner Hazegard-plus to ASTM D 1003 (1997) at 23° C., are considered to have sufficient optical clarity. With regard to haze at 80° C., haze values of less than or equal to 21.0%, especially less than or equal to 20.0%, particularly less than or equal to 18.0% and very particularly less than or equal to 16.0%, measured by means of a Hazemeter BYK Gardner Hazegard-plus to ASTM D 1003 (1997) at 80° C., are considered to be sufficiently optically clear.

A desirable feature of the moulding compositions which serve for production of lighting and glazing is therefore a distinct reduction in the increase in haze at elevated temperature, while maintaining a sufficiently good impact resistance. Especially in the case of use of the products in lighting applications with signal colours, no shift in the colour locus should occur because of an increase in haze, which has limited the use to date of impact-modified moulding compositions.

A desirable feature of the moulding compositions which serve for production of large and/or thin-walled impact-resistant components, and hence also of the components themselves, is a good heat distortion resistance, especially when they—the moulding composition and/or the components—are exposed to an elevated temperature, possibly even over a long period.

The person skilled in the art is thus aware of several parameters which decide whether a moulding composition is suitable for the intended uses:
impact resistance
heat distortion resistance
melt viscosity
haze.

The person skilled in the art is also aware of various ways in which the parameters can be influenced individually:

a) Impact resistance can be improved by an increase in the amount of impact modifier. A reduction in the amount in the moulding composition leads to a decrease in impact resistance. An increase in impact resistance, given the same weight of core-shell-shell particles, can be achieved especially by an increase in size of the core-shell-shell particles or by a distinct increase in the proportion of comonomer(s) having a much lower Tg than the moulding composition itself. But this has an adverse effect on optical properties (haze). On the basis of the prior art, the prevalent opinion is that impact modifiers having a low radius, especially having a radius <150 nm, are not very suitable because of the low level of impact modification achievable for increasing the impact resistance of a moulding composition base, especially a PMMA moulding composition, through addition thereof.

b) Heat distortion resistance: An impact modifier contains comonomers having a much lower Tg than the moulding composition itself. The addition therefore always leads to an overall lowering of heat distortion resistance (Vicat softening temperature). In order to counter this effect, the weight of impact modifier can be reduced or the proportion of comonomer(s) having a much lower Tg than the moulding composition itself is reduced, although this entails a deterioration in impact resistance.

c) Melt viscosity: In order to achieve a lower melt viscosity, the impact modifier content can be reduced, although this again worsens the impact resistance of the moulding composition. An alternative to this is to increase the size of the impact modifier. As a result, however, the haze is again adversely affected.

d) Haze: For very good haze values, impact modifiers of minimum size and a minimum proportion of impact modifier should be used in the base moulding composition. However, this is at the expense of impact resistance, as already discussed under a).

The person skilled in the art is thus aware that there are various ways of optimizing properties of an impact-modified (PMMA) moulding composition, but other properties are adversely affected when particular properties are improved. What would be desirable, however, would be a solution in which all the properties meet minimum requirements.

The problem addressed by the present invention was therefore that of providing a moulding composition having maximum impact resistance in combination with maximum heat distortion resistance and minimum melt viscosity and minimum haze (at room temperature and on heating).

A particular problem addressed was the further problem of providing a moulding composition, preferably a PMMA moulding composition, which fulfils the following requirements:
a Charpy impact resistance to ISO 179 of at least 40.0 kJ/m² at 23° C. and
a haze to ASTM D 1003 (1997) of ≤3% at 23° C. and a haze to ASTM D 1003 (1997) of ≤21% at 80° C. and
a Vicat softening temperature to DIN ISO 306 (August 1994) of ≥98° C. and
a melt volume flow rate (=MVR) to ISO 1133 (230° C.; 3.8 kg) of ≥1.0 cm³/10 min.

A particular problem addressed was that of providing a moulding composition, preferably a PMMA moulding composition, which fulfils the following requirements:
a Charpy impact resistance to ISO 179 of at least 80.0 kJ/m² at 23° C. and
a haze to ASTM D 1003 (1997) of ≤1.5% at 23° C. and a haze to ASTM D 1003 (1997) of ≤18% at 80° C. and
a Vicat softening temperature to DIN ISO 306 (August 1994) of ≥100° C. and
a melt volume flow rate (=MVR) to ISO 1133 (230° C.; 3.8 kg) of ≥2.5 cm³/10 min.

These problems, and further problems which are not stated explicitly but can be derived from the connections discussed herein or are apparent from these, are surprisingly solved by the moulding composition according to Claim 1 and the moulded articles according to Claim 10, and also the uses according to Claims 12 and 13. Preferred embodiments are detailed in the dependent Claims.

The patent thus provides a moulding composition, preferably a PMMA moulding composition, comprising the following, based in each case on the total weight thereof:

I. 10.0% to ≤35.0% by weight, preferably 12.0% to 33.0% by weight, further preferably 14.0% to 30.0% by weight, very preferably 15.0% to 25.0% by weight, of at least one core-shell-shell particle (defined as follows), II. 1.0% to 90.0% by weight, preferably 1.0% to 85.0% by weight, further preferably 1.0% to 80.0% by weight, of at least one (meth)acrylic polymer, III. 0.0% to 45.0% by weight, preferably 0.0% to 30.0% by weight, more preferably 0.0% to 10.0% by weight, of styrene-acrylonitrile copolymers, and IV. 0.0% to 10.0% by weight of further additives, where the percentages by weight of components I. to IV. add up to 100.0% by weight and where II. or the mixture of II., III. and/or IV. is chosen such that it has a refractive index which, from a measurement according to ISO 489 (Method A), differs by not more than 0.01, preferably not more than 0.002, more preferably not more than 0.001, unit from the refractive index of I.

The measurement of refractive index was effected to ISO 489 (Method A). All the measurements were conducted on shaped bodies of thickness 3 mm using 1-bromonaphthalene as immersion fluid.

Production of the Shaped Bodies:

a) In the case of core-shell-shell particles:

Core-shell-shell particles were used to produce a pressed plaque (thickness 3 mm, diameter 50 mm, produced at 100 kN, 210° C., pressing time 20 minutes) which was used for the measurement.

b) In the case of base moulding compositions (=matrix polymer; corresponding to II. or a mixture of II., III. and/or IV.):

An injection-moulded plaque was injection-moulded on a Battenfeld BA injection moulding machine to ISO 294 at melt temperature 250° C., so as to obtain a shaped body having the dimensions 65 mm×40 mm×3 mm.

The core-shell-shell particle I. which is used in the context of the invention is produced or producible by a process in which a) water and emulsifier are initially charged, b) 20.0 to 45.0 parts by weight of a first composition comprising components A), B), C) and D) are added and polymerized up to a conversion of at least 85.0% by weight, based on the total weight of components A), B), C) and D), c) 35.0 to 55.0 parts by weight of a second composition comprising components E), F) and G) are added and polymerized up to a conversion of at least 85.0% by weight, based on the total weight of components E), F) and G), d) 10.0 to 30.0 parts by weight of a third composition comprising components H), I) and J) are added and polymerized up to a conversion of at least 85.0% by weight, based on the total weight of components H), I) and J), where the stated proportions by weight of compositions b), c) and d) add up to 100.0 parts by weight and where the relative proportions of all substances A) to J) are chosen so as to obtain core-shell-shell particles having a total radius, measured by the Coulter method, in the range of >125.0 nm and <180 nm, preferably in the range of >128.0 nm and <160 nm, more preferably in the range of >135.0 nm and <150 nm, and where each polymerization in the process according to I. is conducted at a temperature in the range of >60 to <95° C., preferably >70° C. and <90° C., further preferably ≥75 and ≤85° C.

The progress of the polymerization reaction in each step can be monitored in a known manner, for example by gravimetric means or by means of gas chromatography.

The present invention thus provides, according to claim 1, a moulding composition comprising, based in each case on the total weight thereof:

I. 10.0% to ≤35.0% by weight, preferably 12.0% to 33.0% by weight, further preferably 14.0% to 30.0% by weight, very preferably 15.0% to 25.0% by weight, of at least one core-shell-shell particle produced or producible by a process in which a) water and emulsifier are initially charged, b) 20.0 to 45.0 parts by weight of a first composition comprising:

A) 50.0 to 99.9 parts by weight, preferably 71.0 to 99.9 parts by weight, of alkyl methacrylates having 1 to 20 carbon atoms in the alkyl radical, B) 0.0 to 40.0 parts by weight, preferably 0.0 to 19.0 parts by weight, of alkyl acrylates having 1 to 20 carbon atoms in the alkyl radical, C) 0.1 to 10 parts by weight of crosslinking monomers, where C is preferably allyl methacrylate or where C comprises allyl methacrylate to an extent of at least 50% by weight, preferably to an extent of at least 65% by weight, more preferably to an extent of at least 80% by weight, further preferably to an extent of at least 90% by weight, based in each case on the total weight of C, and D) 0.0 to 8.0 parts by weight of styrenic monomers of the general formula (I)

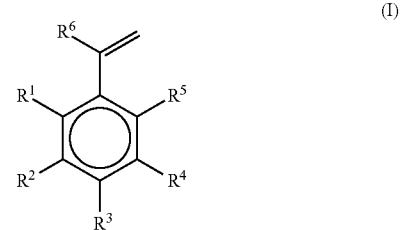

(I)

where the $R^1$ to $R^5$ radicals each independently denote hydrogen, a halogen, a $C_{1-6}$-alkyl group or a $C_{2-6}$-alkenyl group and the $R^6$ radical is hydrogen or an alkyl group having 1 to 6 carbon atoms, are added and polymerized up to a conversion of at least 85.0% by weight, based on the total weight of components A), B), C) and D), c) 35.0 to 55.0 parts by weight of a second composition comprising:

E) 80.0 to 100.0 parts by weight of (meth)acrylates, where E is preferably butyl acrylate or where E comprises butyl acrylate to an extent of at least 50% by weight, preferably to an extent of at least 65% by weight, more preferably to an extent of at least 80% by weight, further preferably to an extent of at least 90% by weight, based in each case on the total weight of E, F) 0.05 to 5.0 parts by weight of crosslinking monomers, where F is preferably allyl methacrylate or where F comprises allyl methacrylate to an extent of at least 50% by weight, preferably to an extent of at least 65% by weight, more preferably to an extent of at least 80% by weight, further preferably to an extent of at least 90% by weight, based in each case on the total weight of F, and G) 0.0 to 25.0 parts by weight of styrenic monomers of the general formula (I)

are added and polymerized up to a conversion of at least 85.0% by weight, based on the total weight of components E), F) and G), d) 10.0 to 30.0 parts by weight of a third composition comprising:

H) 50.0 to 100.0 parts by weight of alkyl methacrylates having 1 to 20 carbon atoms in the alkyl radical, I) 0.0 to 40.0 parts by weight of alkyl acrylates having 1 to 20 carbon atoms in the alkyl radical and J) 0.0 to 10.0 parts by weight of styrenic monomers of the general formula (I)

are added and polymerized up to a conversion of at least 85.0% by weight, based on the total weight of components H), I) and J), where the stated proportions by weight of compositions b), c) and d) add up to 100.0 parts by weight, where the relative proportions of all substances A) to J) are chosen so as to obtain core-shell-shell particles having a total radius, measured by the Coulter method, in the range of >125.0 nm and <180 nm, preferably in the range of >128.0 nm and <160 nm, more preferably in the range of >135.0 nm and <150 nm, and where each polymerization in the process according to I. is conducted at a temperature in the range of >60 to <95° C., preferably >70° C. and <90° C., further preferably ≥75 and ≤85° C.;

II. 1.0% to 90.0% by weight, preferably 1.0% to 85.0% by weight, further preferably 1.0% to 80.0% by weight, of at least one (meth)acrylic polymer, III. 0.0% to 45% by weight, preferably 0.0% to 30% by weight, more preferably 0.0% to 10.0% by weight, of styrene-acrylonitrile copolymers, and IV. 0.0% to 10.0% by weight of further additives, where the percentages by weight of components I) to IV) add up to 100.0% by weight and where II., or the mixture of II., III. and/or IV., is chosen such that it has a refractive index which, when measured according to ISO 489 (Method A), differs by not more than 0.01, preferably by not more than 0.002, more preferably by not more than 0.001, unit from the refractive index of I.

This moulding composition according to the invention is improved in various aspects in terms of the desired properties. Firstly, the at least one impact modifier in the moulding composition according to the invention, preferably the PMMA moulding composition according to the invention, has been specifically selected in terms of its composition of the core and the two shells. In addition, this optimized impact modifier has to be produced or producible by the thermal polymerization process described at at least >60° C. The proportion by weight of impact modifier in the moulding composition according to the invention, preferably in the PMMA moulding composition according to the invention, is restricted to a maximum of 35% by weight. Even though a moulding composition having a comparatively smaller proportion of impact modifier than typically reported in the prior art is thus present in the form of the moulding composition according to the invention, this moulding composition according to the invention achieves unexpectedly high values specifically in relation to the impact resistance thereof. This is completely surprising especially since the impact modifier for use in accordance with the invention has a comparatively small particle radius, namely a radius between 125 and 180 nm, preferably between 128 and 160 nm. The moulding composition has additionally been matched with regard to the refractive index in terms of its constituents. The matching of the refractive index of impact modifier and the surrounding matrix especially has a positive influence on the haze values.

An embodiment having further preference in accordance with the invention is a moulding composition as per the above description, characterized in that the second composition of the core-shell-shell particle according to I. comprises, as G), more than 8.0 parts by weight and up to 19.95 parts by weight, preferably 15.0 to 19.95 parts by weight, of styrenic monomers of the general formula (I).

In addition, a moulding composition according to the invention as per the above description is preferably characterized in that the second composition of the core-shell-shell particle according to I. has a Tg of <−10° C. Further preferably, this moulding composition according to the invention likewise has a first composition of the core-shell-shell particle according to I. having a Tg of >80° C. Likewise preferably, the moulding composition according to the invention, in which the second composition of the core-shell-shell particle according to I. has a Tg of <−10° C., likewise has a third composition of the core-shell-shell particle according to I. having a Tg of >80° C. Very preferably, a moulding composition according to the invention is characterized in that the second composition of the core-shell-shell particle according to I. has a Tg of <−10° C., a first composition of the core-shell particle according to I. has a Tg of >80° C. and a third composition of the core-shell particle according to I. has a Tg of >80° C.

The polymerizations b), c) and/or d) can be initiated with the standard initiators for emulsion polymerization. Suitable organic initiators are, for example, hydroperoxides such as tert-butyl hydroperoxide or cumene hydroperoxide. Suitable inorganic initiators are hydrogen peroxide and the alkali metal and ammonium salts of peroxodisulphuric acid, especially sodium peroxodisulphate and potassium peroxodisulphate. Said initiators can be used individually or as a mixture. The precursors can be used either individually or in a mixture. They are preferably used in an amount of 0.05% to 3.0% by weight, based on the total weight of the monomers in the particular stage.

In a further preferred embodiment, the polymerization in steps b) to d) is initiated using a peroxodisulphate, preferably using ammonium peroxodisulphate and/or alkali metal peroxodisulphate.

Polymerization initiators used may, for example, be 0.01% to 0.5% by weight of alkali metal peroxodisulphate or ammonium peroxodisulphate, based on the water phase, triggering the polymerization at temperatures of 60 to 95° C. Preference is given to working with redox systems, for example composed of 0.01% to 0.05% by weight of organic hydroperoxides and 0.05% to 0.15% by weight of Rongalit® at temperatures of 70 to 85° C. In the polymerization of the hard phase, a suitable amount of a chain transfer agent, for example a mercaptan, is generally used as well, in order to match the molecular weight of the hard phase polymer to that of the moulding composition which is to be modified by the triphasic emulsion polymer.

The initiator can be initially charged or metered in. In addition, it is also possible to initially charge a portion of the initiator and to meter in the remainder.

The mixture can be stabilized by means of emulsifiers and/or protective colloids. Preference is given to stabilization by means of emulsifiers, in order to obtain a low dispersion viscosity.

In the process for obtaining I., anionic and/or nonionic emulsifiers may be used.

In the process for obtaining I., in step a), preferably 90.00 to 99.99 parts by weight of water and 0.01 to 10.00 parts by weight of emulsifier are initially charged, where the stated proportions by weight add up to 100.00 parts by weight.

The total amount of emulsifier is preferably 0.1% to 5% by weight, especially 0.5% to 3% by weight, based on the total weight of monomers A) to J). Particularly suitable emulsifiers anionic and/or nonionic emulsifiers or mixtures thereof, especially:
- alkyl sulphates, preferably those having 8 to 18 carbon atoms in the alkyl radical, alkyl and alkylaryl ether sulphates having 8 to 18 carbon atoms in the alkyl radical and 1 to 50 ethylene oxide units;
- sulphonates, preferably alkylsulphonates having 8 to 18 carbon atoms in the alkyl radical, alkylarylsulphonates having 8 to 18 carbon atoms in the alkyl radical, esters and monoesters of sulphosuccinic acid with monohydric alcohols or alkylphenols having 4 to 15 carbon atoms in the alkyl radical; these alcohols or alkylphenols may optionally be ethoxylated with 1 to 40 ethylene oxide units;
- phosphoric partial esters and the alkali metal and ammonium salts thereof, preferably alkyl and alkylaryl phosphates having 8 to 20 carbon atoms in the alkyl or alkylaryl radical and 1 to 5 ethylene oxide units;
- alkyl polyglycol ethers, preferably having 8 to 20 carbon atoms in the alkyl radical and 8 to 40 ethylene oxide units;
- alkylaryl polyglycol ethers, preferably having 8 to 20 carbon atoms in the alkyl or alkylaryl radical and 8 to 40 ethylene oxide units;
- ethylene oxide/propylene oxide copolymers, preferably block copolymers, favourably having 8 to 40 ethylene oxide and/or propylene oxide units.

In one embodiment of the invention, the emulsion polymerization is conducted in the presence of anionic emulsifiers selected from the group consisting of paraffinsulphonates, alkyl sulphosuccinates and alkoxylated and sulphonated paraffins.

Preference is given to using mixtures of anionic emulsifier and nonionic emulsifier. Very particularly useful mixtures have been found to be those of an ester or monoester of sulphosuccinic acid with monohydric alcohols or alkylphenols having 4 to 15 carbon atoms in the alkyl radical as anionic emulsifier and an alkyl polyglycol ether, preferably having 8 to 20 carbon atoms in the alkyl radical and 8 to 40 ethylene oxide units, as nonionic emulsifier in a weight ratio of 8:1 to 1:8.

Optionally, the emulsifiers may also be used in a mixture with protective colloids. Suitable protective colloids include partly hydrolysed polyvinylacetates, polyvinylpyrrolidones, carboxylmethyl, methyl, hydroxyethyl and hydroxypropyl cellulose, starches, proteins, poly(meth)acrylic acid, poly(meth)acrylamide, polyvinylsulphonic acids, melamine formaldehyde sulphonates, naphthalene formaldehyde sulphonates, styrene-maleic acid and vinyl ether-maleic acid copolymers. If protective colloids are used, they are preferably used in an amount of 0.01% to 1.0% by weight, based on the total amount of monomers A) to J). The protective colloids can be initially charged or metered in before the start of the polymerization.

In a preferred embodiment, in the process for obtaining I., an aqueous emulsion containing an alkyl alcohol having 12 to 20 carbon atoms in the alkyl radical is initially charged.

Preferably, the polymerization is started by heating the mixture to the polymerization temperature and metering in the initiator, preferably in aqueous solution. The metered additions of emulsifier and monomers can be conducted separately or as a mixture. In the case of metered addition of mixtures of emulsifier and monomer, the procedure is to premix emulsifier and monomer in a mixer connected upstream of the polymerization reactor. Preferably, the remainder of emulsifier and the remainder of monomer which have not been initially charged are metered in separately after the polymerization has started. Preferably, the metered addition is commenced 15 to 35 minutes after the polymerization has started.

In addition, it is particularly advantageous for the purposes of the present invention for the initial charge to contain what is called a "seed latex", preferably obtainable by polymerizing alkyl (meth)acrylates.

Preference is given to initially charging an aqueous emulsion a) containing a seed latex. In a preferred embodiment, a seed latex having a particle diameter measured by the Coulter method in the range from 10.0 to 40.0 nm is initially charged.

These small radii can be calculated after a defined polymerization onto the seed latex, in which a shell is formed around the seed latex and the radii of the particles thus produced were measured by the Coulter method. This method of particle size determination, which is known in the literature, is based on the measurement of the electrical resistance, which changes in a characteristic manner as the particles pass through a narrow measurement orifice. Further details can be found, for example, in Nachr. Chem. Tech. Lab. 43, 553-566 (1995).

Added to the seed latex are the monomer constituents of the actual core, i.e. the first composition, preferably under such conditions that the formation of new particles is avoided. In this way, the polymer formed in the first process stage is deposited in the form of a shell around the seed latex. Analogously, the monomer constituents of the first shell material (second composition) are added to the emulsion polymer under such conditions that the formation of new particles is avoided. In this way, the polymer formed in the second stage is deposited in the form of a shell around the existing core. This procedure should be repeated correspondingly for every further shell.

In a further preferred embodiment of the present invention, the core-shell-shell particles according to the invention are obtained by an emulsion polymerization process in which, rather than the seed latex, a long-chain aliphatic alcohol, preferably having 12 to 20 carbon atoms, is initially charged in emulsified form. In a preferred embodiment of this process, stearyl alcohol is used as the long-chain aliphatic alcohol. The core-shell-shell structure is obtained analogously to the above-described procedure by stepwise addition and polymerization of the corresponding monomers with avoidance of the formation of new particles. Further details of the polymerization process can be found by the person skilled in the art in patent specifications DE 3343766, DE 3210891, DE 2850105, DE 2742178 and DE 3701579.

Irrespective of the specific procedure, however, it has been found to be particularly favourable in the context of the present invention, in the process for obtaining I., to meter in the second (as per c)) and third (as per d)) compositions in accordance with their consumption.

The chain lengths, especially of the (co)polymers of the second shell (third composition), can be adjusted by polymerization of the monomer or monomer mixture in the presence of molecular weight regulators (chain transfer agents)

such as, in particular, the mercaptans known for the purpose, for example n-butyl mercaptan, n-dodecyl mercaptan, 2-mercaptoethanol or 2-ethylhexyl thioglycolate, pentaerythritol tetrathioglycolate, where the molecular weight regulators are used generally in amounts of 0.05% to 5% by weight, based on the monomer mixture, preferably in amounts of 0.1% to 2% by weight and more preferably in amounts of 0.2% to 1% by weight, based on the monomer mixture, (cf., for example, H. Rauch-Puntigam, Th. Völker, "Acryl- and Methacrylverbindungen" [Acrylic and methacrylic compounds], Springer, Heidelberg, 1967; Houben-Weyl, Methoden der organischen Chemie [Methods of Organic Chemistry], vol. XIV/1. page 66, Georg Thieme, Heidelberg, 1961 or Kirk-Othmer, Encyclopedia of Chemical Technology, vol. 1, pages 29611, J. Wiley, New York, 1978). Preference is given to using n-dodecyl mercaptan as molecular weight regulator.

According to the invention, in the process for obtaining I., the relative proportions of all substances A) to J) are chosen so as to obtain core-shell-shell particles having a total radius, measured by the Coulter method, in the range of >125.0 nm and <180 nm, preferably in the range of >128.0 nm and <160 nm, more preferably in the range of >135.0 nm and <150 nm.

For the purposes of the present invention, it is particularly advantageous, in the process for obtaining I., to choose the relative proportions of all the substances A) to J) in such a way that the total weight of substances A) to J), based on the total weight of the aqueous dispersion, is at least 30% by weight and preferably between 40% and 50% by weight.

The term "coagulate" in this connection refers to water-insoluble constituents which can preferably be filtered off by filtering the dispersion, appropriately through a filter sleeve fitted with a DIN 4188 No. 0.90 filter fabric. The core-shell-shell particle according to the invention can be obtained from the dispersion, for example, by spray-drying, freeze coagulation, precipitation by addition of electrolyte or by mechanical or thermal stress, as implementable according to DE 27 50 682 A1 or U.S. Pat. No. 4,110,843 by means of a vented extruder. The process of spray-drying is the most commonly used, even though the other processes mentioned have the benefit that the water-soluble polymerization auxiliaries are at least partly separated from the polymer therein.

The first composition according to b) of the core-shell-shell particles as per I. comprises
A) 50.0 to 99.9 parts by weight, preferably 71.0 to 99.9 parts by weight, of alkyl methacrylates having 1 to 20, preferably 1 to 12, especially 1 to 8, carbon atoms in the alkyl radical,
B) 0.0 to 40.0 parts by weight, preferably 0.0 to 19.0 parts by weight, of alkyl acrylates having 1 to 20, preferably 1 to 12, especially 1 to 8, carbon atoms in the alkyl radical,
C) 0.1 to 10.0 parts by weight of crosslinking monomers and
D) 0.0 to 8.0 parts by weight of styrenic monomers of the general formula (I)

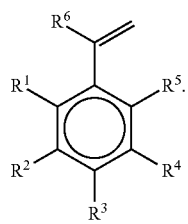

(I)

The $R^1$ to $R^5$ radicals are each independently hydrogen, a halogen, especially fluorine, chlorine or bromine, a $C_{1-6}$-alkyl group or a $C_{2-6}$-alkenyl group, preferably hydrogen. The $R^6$ radical indicates hydrogen or an alkyl group having 1 to 6 carbon atoms, preferably hydrogen. Particularly suitable alkyl groups having 1 to 6 carbon atoms are methyl, ethyl, n-propyl, isopropyl, n-butyl, sec-butyl, tert-butyl, n-pentyl, n-hexyl groups, and cyclopentyl and cyclohexyl groups.

Thus, styrenic monomers of the general formula (I) include styrene, substituted styrenes having an alkyl substituent in the side chain, for example α-methylstyrene and α-ethylstyrene, substituted styrenes having an alkyl substituent on the ring, such as vinyltoluene and p-methylstyrene, halogenated styrenes, for example monochlorostyrenes, dichlorostyrenes, tribromostyrenes and tetrabromostyrenes.

In a particular embodiment of the core-shell-shell particles for use in accordance with the invention as per I., the first composition comprises
A) 75.0 to 99.9 parts by weight, especially 85.0 to 99.8 parts by weight, of alkyl methacrylates having 1 to 20, preferably 1 to 12, especially 1 to 8, carbon atoms in the alkyl radical,
B) 0.0 to 24.9 parts by weight, especially 0.1 to 14.9 parts by weight, of alkyl acrylates having 1 to 20, preferably 1 to 12, especially 1 to 8, carbon atoms in the alkyl radical,
C) 0.1 to 5.0 parts by weight, especially 0.1 to 2.0 parts by weight, of crosslinking monomers and
D) 0.0 to 8.0 parts by weight of styrenic monomers of the general formula (I),
where the proportions by weight stated add up to 100.0 parts by weight.

According to the invention, the compounds A), B), C) and D) are different from one another; in particular, the compounds A) and B) do not include any crosslinking monomers C).

The abovementioned alkyl methacrylates (A) are understood to mean esters of methacrylic acid, for example methyl methacrylate, ethyl methacrylate, propyl methacrylate, isopropyl methacrylate, n-butyl methacrylate, sec-butyl methacrylate, tert-butyl methacrylate, pentyl methacrylate, hexyl methacrylate, heptyl methacrylate, octyl methacrylate, 2-octyl methacrylate, ethylhexyl methacrylate, nonyl methacrylate, 2-methyloctyl methacrylate, 2-tert-butylheptyl methacrylate, 3-isopropylheptyl methacrylate, decyl methacrylate, undecyl methacrylate, 5-methylundecyl methacrylate, dodecyl methacrylate, 2-methyldodecyl methacrylate, tridecyl methacrylate, 5-methyltridecyl methacrylate, tetradecyl methacrylate, pentadecyl methacrylate, hexadecyl methacrylate, 2-methylhexadecyl methacrylate, heptadecyl methacrylate, 5-isopropylheptadecyl methacrylate, 5-ethyloctadecyl methacrylate, octadecyl methacrylate, nonadecyl methacrylate, eicosyl methacrylate, cycloalkyl methacrylates, for example cyclopentyl methacrylate, cyclohexyl methacrylate, 3-vinyl-2-butylcyclohexyl methacrylate, cycloheptyl methacrylate, cyclooctyl methacrylate, bornyl methacrylate and isobornyl methacrylate.

In a particularly preferred embodiment of the present invention, the first composition, based on the total weight of components A) to D), contains at least 50% by weight, appropriately at least 60% by weight, preferably at least 75% by weight, especially at least 85% by weight, of methyl methacrylate.

The abovementioned alkyl acrylates (B) are understood to mean esters of acrylic acid, for example methyl acrylate, ethyl acrylate, propyl acrylate, isopropyl acrylate, n-butyl acrylate, sec-butyl acrylate, tert-butyl acrylate, pentyl acrylate, hexyl acrylate, heptyl acrylate, octyl acrylate, 2-octyl acrylate, ethylhexyl acrylate, nonyl acrylate, 2-methyloctyl acrylate, 2-tert-butylheptyl acrylate, 3-isopropylheptyl acrylate, decyl acrylate, undecyl acrylate, 5-methylundecyl acrylate, dodecyl acrylate, 2-methyldodecyl acrylate, tridecyl acrylate, 5-methyltridecyl acrylate, tetradecyl acrylate, pentadecyl acrylate, hexadecyl acrylate, 2-ethylhexadecyl acrylate, heptadecyl acrylate, 5-isopropylheptadecyl acrylate, 5-ethyloctadecyl acrylate, octadecyl acrylate, nonadecyl acrylate, eicosyl acrylate, cycloalkyl acrylates, for example cyclopentyl acrylate, cyclohexyl acrylate, 3-vinyl-2-butylcyclohexyl acrylate, cycloheptyl acrylate, cyclooctyl acrylate, bornyl acrylate and isobornyl acrylate.

Crosslinking monomers (C) include all compounds which are capable of bringing about crosslinking under the present polymerization conditions. These especially include (a) difunctional (meth)acrylates, preferably compounds of the general formula:

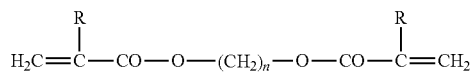

in which R is hydrogen or methyl and n is a positive integer greater than or equal to 2, preferably from 3 to 20, especially di(meth)acrylates of propanediol, butanediol, hexanediol, octanediol, nonanediol, decanediol and eicosanediol;
compounds of the general formula:

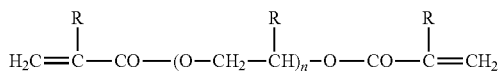

in which R is hydrogen or methyl and n is a positive integer from 1 to 14, especially di(meth)acrylates of ethylene glycol, diethylene glycol, triethylene glycol, tetraethylene glycol, dodecaethylene glycol, tetradecaethylene glycol, propylene glycol, dipropyl glycol and tetradecapropylene glycol;
glycerol di(meth)acrylate, 2,2'-bis[p-(γ-methacryloyloxy-β-hydroxypropoxy)phenylpropane] or bis-GMA, bisphenol A dimethacrylate, neopentyl glycol di(meth)acrylate, 2,2'-di(4-methacryloyloxypolyethoxyphenyl)propane having 2 to 10 ethoxy groups per molecule and 1,2-bis(3-methacryloyloxy-2-hydroxypropoxy)butane, (b) tri- or polyfunctional (meth)acrylates, especially trimethylolpropane tri(meth)acrylates and pentaerythritol tetra(meth)acrylate;

(c) graft crosslinkers having at least two C—C double bonds of different reactivity, especially allyl methacrylate and allyl acrylate; and (d) aromatic crosslinkers, especially 1,2-divinylbenzene, 1,3-divinylbenzene and 1,4-divinylbenzene.

Preferably, the monomers and the proportions by weight of the monomers A) to D) of the first composition are selected in such a way that the polymer obtainable by the polymerization of the first composition has a glass transition temperature Tg of at least 10° C., preferably of at least 30° C. The glass transition temperature Tg of the polymer can be determined here in a known manner by means of differential scanning calorimetry (DSC). In addition, the glass transition temperature Tg can also be calculated approximately in advance by means of the Fox equation. According to Fox T. G., Bull. Am. Physics Soc. 1, 3, page 123 (1956):

$$\frac{1}{Tg} = \frac{x_1}{Tg_1} + \frac{x_2}{Tg_2} + \ldots + \frac{x_n}{Tg_n}$$

where $x_n$ is the mass fraction (% by weight/100) of the monomer n and $Tg_n$ is the glass transition temperature in kelvin of the homopolymer of the monomer n. Further helpful pointers can be found by the person skilled in the art in Polymer Handbook $2^{nd}$ Edition, J. Wiley & Sons, New York (1975), which gives Tg values for the most common homopolymers.

According to the invention, unless specifically stated otherwise, specific figures hereinafter relate to determination by means of the Fox equation.

The second composition according to c) of the core-shell-shell particles as per I. comprises
E) 80.0 to 99.95 parts by weight of (meth)acrylates,
F) 0.05 to 5.0 parts by weight of crosslinking monomers and
G) 0.0 to 19.95 parts by weight of styrenic monomers of the general formula (I).

According to the invention, the compounds E), F) and G) are different from one another; in particular, the compounds E) do not include any crosslinking monomers F).

In a particular embodiment, the second composition of the core-shell-shell particles as per I. comprises
E) 80.0 to 91.9 parts by weight of (meth)acrylates,
F) 0.1 to 2.0 parts by weight of crosslinking monomers and
G) 8.0 to 19.9 parts by weight of styrenic monomers of the general formula (I),
where the proportions by weight stated preferably add up to 100.0 parts by weight.

In the context of the present invention, (meth)acrylates refer to acrylates and methacrylates, and also mixtures of the two. They thus include compounds which have at least one group of the following formula:

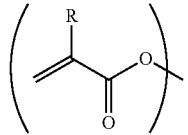

where R denotes hydrogen or a methyl radical. These especially include the aforementioned alkyl acrylates and alkyl methacrylates. In addition, arylalkyl acrylates, especially benzyl, phenylethyl, phenylpropyl, phenylpentyl and/or phenylhexyl acrylate, have also been found to be particularly useful for the purposes of the present invention. They are preferably used in an amount in the range from 0.1% to 40.0% by weight, based on the total weight of components E) and F).

According to the invention, the crosslinking monomers F) comprise the aforementioned crosslinking monomers C).

Preferably, E) comprises alkyl acrylates having 3 to 8 carbon atoms in the alkyl radical and/or alkyl methacrylates having 7 to 14 carbon atoms in the alkyl radical.

In a very particularly preferred embodiment of the present invention, the second composition of the core-shell-shell particles as per I. comprises
E) 90.0 to 99.9 parts by weight of alkyl acrylates having 3 to 8 carbon atoms in the alkyl radical and/or alkyl methacrylates having 7 to 14 carbon atoms in the alkyl radical, especially butyl acrylate and/or dodecyl methacrylate,
F) 0.1 to 2.1 parts by weight of crosslinking monomers and
G) 0.0 to 9.9 parts by weight, preferably 8.0 to 9.9 parts by weight, of styrenic monomers of the general formula (I), where the proportions by weight preferably add up to 100.0 parts by weight.

In addition, the monomers and the proportions by weight of the monomers E), F) and G) of the second composition are favourably selected in such a way that the polymer obtainable by the polymerization of the second composition has a glass transition temperature Tg of less than 30° C., preferably less than 10° C., especially in the range from 0 to −75° C. It is possible here to determine the glass transition temperature Tg of the polymer, as already mentioned above, by means of differential scanning calorimetry (DSC) and/or to calculate it approximately in advance by means of the Fox equation. According to the invention, the determination is effected via the Fox equation.

The third composition according to d) of the core-shell-shell particles as per I. comprises
H) 50.0 to 100.0 parts by weight of alkyl methacrylates having 1 to 20, preferably 1 to 12, especially 1 to 8, carbon atoms in the alkyl radical,
I) 0.0 to 40.0 parts by weight of alkyl acrylates having 1 to 20, preferably 1 to 12, especially 1 to 8, carbon atoms in the alkyl radical and
J) 0.0 to 10.0 parts by weight of styrenic monomers of the general formula (I).

The third composition of the core-shell-shell particles as per I. contains, in a preferred embodiment,
H) 60.0 to 100.0 parts by weight, preferably 77.0 to 99.9 parts by weight, especially 85.0 to 99.5 parts by weight, of alkyl methacrylates having 1 to 20, preferably 1 to 12, especially 1 to 8, carbon atoms in the alkyl radical,
I) 0.0 to 30.0 parts by weight, especially 0.1 to 15.0 parts by weight, of alkyl acrylates having 1 to 20, preferably 1 to 12, especially 1 to 8, carbon atoms in the alkyl radical,
J) 0.0 to 10.0 parts by weight, preferably 0.0 to 8.0 parts by weight, of styrenic monomers of the general formula (I), where the proportions by weight stated preferably add up to 100.0 parts by weight.

In a particularly preferred embodiment of the present invention, the third composition of the core-shell-shell particles as per I., based on the total weight of components H) to J), contains at least 50% by weight, appropriately at least 60% by weight, preferably at least 75% by weight, especially at least 85% by weight, of methyl methacrylate.

In addition, the monomers and the proportions by weight of the monomers H), I) and J) of the third composition are favourably selected in such a way that the polymer obtainable by the polymerization of the third composition has a glass transition temperature Tg of at least 10° C., preferably of at least 30° C. It is possible here to determine the glass transition temperature Tg of the polymer, as already mentioned above, by means of differential scanning calorimetry (DSC) and/or to calculate it approximately in advance by means of the Fox equation. Unless stated otherwise, the determination is effected by means of the Fox equation.

The core-shell-shell particle I. serves to improve the impact resistance of hard thermoplastics which are compatible with the hard phase, preferably in the moulding compositions according to the invention, such as poly(meth)acrylate moulding compositions, especially polymethylmethacrylate.

Preferably, the at least one (meth)acrylic polymer as per II., based in each case on the total weight thereof, comprises
a) 52.0% to 100.0% by weight of repeat alkyl methacrylate units having 1 to 20, preferably 1 to 12, advantageously 1 to 8, especially 1 to 4, carbon atoms in the alkyl radical,
b) 0.0% to 40.0% by weight of repeat alkyl acrylate units having 1 to 20, preferably 1 to 12, advantageously 1 to 8, especially up to 4, carbon atoms in the alkyl radical and
c) 0.0% to 8.0% by weight of repeat styrenic units of the general formula (I),
where the percentages by weight add up to 100.0% by weight.

More preferably, the at least one (meth)acrylic polymer as per II., based in each case on the total weight thereof, comprises
a) 68.0% to 100.0% by weight, preferably 75.0% to 99.9% by weight, especially 85.0% to 99.5% by weight, of repeat alkyl methacrylate units having 1 to 20, preferably 1 to 12, advantageously 1 to 8, especially 1 to 4, carbon atoms in the alkyl radical,
b) 0.0% to 25.0% by weight, preferably 0.1% to 17.0% by weight, especially 0.5% to 15.0% by weight, of repeat alkyl acrylate units having 1 to 20, preferably 1 to 12, advantageously 1 to 8, especially up to 4, carbon atoms in the alkyl radical and
c) 0.0% to 8.0% by weight of repeat styrenic units of the general formula (I),
where the percentages by weight add up to 100.0% by weight.

In a further particularly preferred embodiment of the present invention, the at least one (meth)acrylic polymer as per II., based on the total weight thereof, contains at least 50.0% by weight, appropriately at least 60.0% by weight, preferably at least 75.0% by weight, especially at least 85.0% by weight, of repeat methyl methacrylate units.

In a further, likewise preferred embodiment of the present invention, the at least one (meth)acrylic polymer as per II. contains ≤8% by weight of repeat alkyl acrylate units having 1 to 20 carbon atoms in the alkyl radical, preferably ≤6% by weight, further preferably ≤4% by weight, very preferably ≤2% by weight, most preferably ≤1% by weight, based in each case on the total weight of the (meth)acrylic polymer as per II. More preferably, the repeat alkyl acrylate units are repeat methyl acrylate units.

In addition, the at least one (meth)acrylic polymer as per II. preferably has a number-average molecular weight in the range from 10 000 to 1 000 000 g/mol, preferably in the range from 50 000 to 500 000 g/mol, especially in the range from 60 000 to 100 000 g/mol. The molecular weight can be determined here, for example, by means of gel permeation chromatography with calibration with a polystyrene standard.

Most preferably, constituent II. comprises two or more different (meth)acrylic polymers. In the case that at least one further (meth)acrylic polymer is present, it is especially preferable for this (meth)acrylic polymer to be of low molecular weight. It is particularly preferable when the low molecular weight (meth)acrylic polymer has a number-average molecular weight in the range from 1000 to 70 000 g/mol, preferably in the range from 5000 to 60 000 g/mol. The low molecular weight (meth)acrylic polymer may account for a proportion of 2%-20% by weight, preferably of 5%-10% by weight, based on the total weight of the (meth)acrylic polymer II. The proportionate addition of a low molecular weight (meth)acrylic polymer improves the processibility of the moulding composition achieved overall in injection moulding or in injection-compression moulding.

The person skilled in the art is aware of standard flow improvers in the form of low molecular weight (meth) acrylic polymers.

Preferably, the at least one (meth)acrylic polymer as per II. may also take the form of at least one copolymer, preferably of at least one high-Tg copolymer. "High-Tg" in the context of the present invention is understood to mean that the high-Tg copolymer has a higher Tg (glass transition temperature) than polymethylmethacrylate, preferably at least 110° C., more preferably at least 115° C., further preferably at least 120° C., and especially preferably even at least 125° C., measured by means of differential scanning calorimetry under a nitrogen atmosphere to ISO 11357. A "high-Tg" composition may be a) a "high-Tg" copolymer of methyl methacrylate and at least one other monomer, the resulting copolymer having a Tg greater than that of polymethylmethacrylate of about 105° C., or b) a mixture of a (meth)acrylic polymer and at least one miscible, semi-miscible or compatible polymer, where the overall Tg in the case of a miscible polymer or at least one of the Tgs in the case of a semi-miscible polymer is greater than 110° C., or c) polymethylmethacrylate having a higher level of syndiotacticity than randomly polymerized PMMA.

Suitable monomers which can impart a higher Tg in a copolymer include, but are not limited to, methacrylic acid, acrylic acid, itaconic acid, substituted styrenes, alpha-methylstyrene, maleic anhydride, isobornyl methacrylate, norbornyl methacrylate, t-butyl methacrylate, cyclohexyl methacrylate, substituted cyclohexyl methacrylates, vinylcyclohexane, phenyl methacrylates, acrylamides, N-isopropylacrylamide, methacrylamides, substituted maleimides, glutarimides and maleimides.

In a preferred embodiment, the moulding composition according to the invention contains up to 45% by weight of styrene-acrylonitrile copolymers as per III., especially 1.0% to 45% by weight, based on the total weight of the moulding composition. More preferably, the styrene-acrylonitrile copolymers as per III. are obtained and/or obtainable by polymerizing a mixture consisting of 70% to 92% by weight of styrene,
8% to 30% by weight of acrylonitrile and
0% to 22% by weight of further comonomers, based in each case on the total weight of the mixture.

The moulding compositions according to the invention may contain further additives as per IV., especially polymers, in order to modify the properties in a suitable manner.

Customary additives according to IV. may be added in any processing stage suitable for the purpose. These customary additives include dyes, pigments, fillers, reinforcing fibres, lubricants, UV stabilizers, etc.

Based on the total weight of the moulding composition according to the invention, this moulding composition may contain 0.1% to 10% by weight, preferably 0.5% to 5.0% by weight, especially 1.0% to 4.0% by weight, of a further polymer (AP) as additive according to IV., having a weight-average molecular weight at least 10%, preferably at least 50%, especially at least 100%, higher compared to the at least one (meth)acrylic polymer as per II. The molecular weight can be determined here, for example, by means of gel permeation chromatography with calibration with a polystyrene standard.

Polymers (AP) that are particularly suitable in accordance with the invention comprise, based in each case on the total weight thereof, preferably a) 52.0% to 100.0% by weight, appropriately 60.0% to 100.0% by weight, preferably 75.0% to 99.9% by weight, especially 85.0% to 99.5% by weight, of repeat alkyl methacrylate units having 1 to 20, preferably 1 to 12, advantageously 1 to 8, especially 1 to 4, carbon atoms in the alkyl radical, b) 0.0% to 40.0% by weight, appropriately 0.0% to 32.0% by weight, preferably 0.1% to 17.0% by weight, especially 0.5% to 7.0% by weight, of repeat alkyl acrylate units having 1 to 20, preferably 1 to 12, advantageously 1 to 8, especially 1 to 4, carbon atoms in the alkyl radical and c) 0.0% to 8.0% by weight of repeat styrenic units of the general formula (I), where the percentages by weight add up to 100.0% by weight.

In a particularly preferred embodiment of the present invention, the polymer (AP), based on the total weight thereof, contains at least 50.0% by weight, appropriately at least 60.0% by weight, preferably at least 75.0% by weight, especially at least 85.0% by weight, of repeat methyl methacrylate units.

In addition, the polymer (AP) preferably has a weight-average molecular weight in the range from 10 000 to 100 000 000 g/mol, preferably in the range from 50 000 to 5 000 000 g/mol, advantageously in the range from 100 000 to 1 000 000 g/mol, especially in the range from 250 000 to 600 000 g/mol. The molecular weight can be determined here, for example, by means of gel permeation chromatography with calibration with a polystyrene standard.

Other suitable polymers (AP) are polyacrylonitriles, polystyrenes, polyethers, polyesters, polycarbonates, polytetrafluoroethylene and polyvinylchlorides. The polymers can be used individually or as a mixture.

The moulding composition according to the invention can be produced in various ways. For example, it is possible to mix the dispersion of the core-shell-shell particle I. with an aqueous dispersion of the blend component and to coagulate the mixture, remove the water phase and coalesce the coagulate to form a moulding composition. In this process, it is possible to achieve particularly homogeneous mixing of the two compositions. The components can also be produced separately and isolated and mixed in the form of melts thereof or as powders or granules and homogenized in a multi-screw extruder or in a roll mill.

Preferably, the moulding composition according to the invention has the following:

a. a Charpy impact resistance to ISO 179 of at least 40.0 kJ/m$^2$, preferably of at least 60.0 kJ/m$^2$, more preferably of at least 80.0 kJ/m$^2$, at 23° C. and b. a haze to ASTM D 1003 (1997) of ≤3% at 23° C., preferably of ≤2% at 23° C., further preferably of ≤1.5% at 23° C., very preferably of ≤1.0% at 23° C., and a haze to ASTM D 1003 (1997) of ≤21% at 80° C., preferably of ≤20% at 80° C., further preferably of ≤18% at 80° C., very preferably of ≤16% at 80° C., and c. a Vicat softening temperature to DIN ISO 306 (August 1994) of ≥98° C., preferably ≥99° C., more preferably ≥100° C., very preferably ≥102° C., and d. a melt volume flow rate (MVR) to ISO 1133 (230° C.; 3.8 kg) of ≥1.5 cm$^3$/10 min, preferably of ≥2.0 cm$^3$/10 min, further preferably of ≥2.5 cm$^3$/10 min.

In the context of the present invention, the haze of the moulding compositions according to the invention is always determined on 3 mm injection mouldings.

This application further provides a moulded article obtainable from the moulding composition according to the invention.

The moulding composition according to the invention is especially suitable for production of moulded articles, appropriately having a wall thickness exceeding 1 mm, such as extruded sheets of thickness 1 to 10 mm which have good amenability to die-cutting and are usable, for example, for production of printable cover plates for electrical appliances, or for production of high-quality injection mouldings, for example motor vehicle panels. Thinner films having a thickness of, for example, 50 μm can likewise be produced therefrom.

Preferably, the moulded article according to the invention has the following:

a. a Charpy impact resistance to ISO 179 of at least 40.0 kJ/m$^2$, preferably of at least 60.0 kJ/m$^2$, more preferably of at least 80.0 kJ/m$^2$, at 23° C. and b. a haze to ASTM D 1003 (1997) of ≤3% at 23° C., preferably of ≤2% at 23° C., further preferably of ≤1.5% at 23° C., very preferably of ≤1.0% at 23° C., and a haze to ASTM D 1003 (1997) of ≤21% at 80° C., preferably of ≤20% at 80° C., further preferably of ≤18% at 80° C., very preferably of ≤16% at 80° C., and c. a Vicat softening temperature to DIN ISO 306 (August 1994) of ≥98° C., preferably ≥99° C., more preferably ≥100° C., very preferably ≥102° C., and d. a melt volume flow rate (MVR) to ISO 1133 (230° C.; 3.8 kg) of ≥1.5 cm$^3$/10 min, preferably of ≥2.0 cm$^3$/10 min, further preferably of ≥2.5 cm$^3$/10 min.

In the context of the present invention, the haze of the moulded articles according to the invention is determined on produced 3 mm injection mouldings (the injection mouldings are obtained by re-granulating the moulded articles and then injection-moulding them to give the moulding required).

Because of the properties of a distinctly reduced increase in haze at elevated temperature that have surprisingly been found, the products are especially suitable for applications such as lighting and glazing. When the products are used in lighting applications with signal colours, no shift in the colour locus is to be expected owing to an increase in haze.

A further field of use for the moulding composition impact-modified in accordance with the invention is for automotive glazing. The demands for toughness are met in combination with heat distortion resistance and optical properties such as high transparency coupled with very low haze even at elevated temperatures.

The invention therefore further relates to the use of the moulding composition according to the invention and to the use of the moulded article according to the invention.

More particularly, the invention relates to the use of the moulding composition according to the invention for production of large and/or thin-walled components in injection moulding and for production of glass panes/glazing (for example covers for vehicle lights, i.e. headlamps or rear lights; coloured glass covers for automobile lights; further varied lighting applications for building interior and/or exterior lighting which have to meet high demands particularly with regard to vandalism, thermal stability and good processibility).

It is a particular, frequent requirement in the production of said mouldings by injection moulding or injection-compression moulding, because of the often large dimensions and low wall thicknesses, for the molten moulding composition to have good flow properties.

The use of the moulding composition according to the invention for production of the coloured glass covers for automobile lights mentioned is especially relevant, since these coloured glass covers have to fulfil official legal requirements relating to colour loci according to SAE and ECE.

The invention further relates to the use of the moulding composition according to the invention for production of displays for communication devices, especially PDAs, mobile phones, preferably smartphones; tablet PCs; TV devices; kitchen appliances and other electronic devices.

Especially preferably, the invention relates to the use of the moulding composition according to the invention for production of large and/or thin-walled components in injection moulding, which come into contact with hot media and/or radiated heat (for example light coupling) and which consequently have to fulfil high demands, especially with regard to thermal stability.

More particularly, the invention further relates to the use of the moulded article according to the invention in the form of impact-modified and large and/or thin-walled components from injection moulding, glass panes/glazing (for example covers for vehicle lights, i.e. headlamps or rear lights; coloured glass covers for automobile lights; further varied lighting applications for building interior and/or exterior lighting which have to meet high demands particularly with regard to vandalism, thermal stability and good processibility).

The invention further relates to the use of the moulded article according to the invention in the form of displays for communication devices, especially PDAs, mobile phones, preferably smartphones; tablet PCs; TV devices; kitchen appliances and other electronic devices.

The examples which follow are intended to illustrate the invention in detail.

EXAMPLES

Core-Shell-Shell Particles I. (CE1-3 and IE1-3)
Production of the Seed Latex

A seed latex was produced by means of emulsion polymerization of a monomer composition containing 98% by weight of ethyl acrylate and 2% by weight of allyl methacrylate. These particles having a diameter of about 20 nm were present in a concentration of about 10% by weight in water.

Production of the Core-Shell-Shell Particles

All the core-shell-shell particles described hereinafter were produced by means of emulsion polymerization according to Preparation Method A below (Inventive Examples IE1, IE2, IE3 and Comparative Example CE1) or Preparation Method B below (Comparative Examples CE2 and CE3). This was done using the emulsions (i) to (iii) specified in Table 1.

Inventive Examples IE1, IE2, IE3 and Comparative Example CE1

Production of the Core-Shell-Shell Particles by Preparation Method A

At 83° C. (internal tank temperature), 1.711 kg of water were initially charged in a stirred polymerization tank. 1.37 g of sodium carbonate and seed latex were added. Subsequently, emulsion (i) was metered in over the course of 1 h. 10 min after the feeding of emulsion (i) had ended, emulsion (ii) was metered in over a period of about 2 h. Subsequently, about 60 min after the feeding of emulsion (ii) had ended, emulsion (iii) was metered in over a period of about 1 h. 30 min after the feeding of emulsion (iii) had ended, the mixture was cooled to 30° C.

To separate the core-shell-shell particles, the dispersion was frozen at −20° C. for 2 days, then thawed again, and the coagulated dispersion was separated by means of a filter fabric. The solids were dried at 50° C. in a drying cabinet (for about 3 days). The particle size of the core-shell-shell particles (see Table 2) was determined by means of a Coulter Nano-Sizer ® N5, by analysing the particles in dispersion.

Comparative Examples CE2 and CE3

Production of the Core-Shell-Shell Particles by Preparation Method B

At 52° C. (internal tank temperature), 1.711 kg of water were initially charged in a stirred polymerization tank, and 0.10 g of acetic acid, 0.0034 g of iron(II) sulphate, 0.69 g of sodium disulphite and the seed latex were added. Subsequently, emulsion (i) was metered in over the course of 1.5 h. 10 min after the feeding of emulsion (i) had ended, 7.46 g of sodium disulphite dissolved in 100 g of water were added and emulsion (ii) was metered in over a period of about 2.5 h. Subsequently, about 30 min after the feeding of emulsion (ii) had ended, 0.62 g of sodium disulphite dissolved in 50 g of water were added and emulsion (iii) was metered in over a period of about 1.5 h. 30 min after the feeding of emulsion (iii) had ended, the mixture was cooled to 30° C.

To separate the core-shell-shell particles, the dispersion was frozen at -20° C. for 2 days, then thawed again, and the coagulated dispersion was separated by means of a filter fabric. The solids were dried at 50° C. in a drying cabinet (for about 3 days). The particle size of the core-shell-shell particles (see Table 2) was determined by means of a Coulter Nano-Sizer ® N5, by analysing the particles in dispersion.

Blending of the Moulding Compositions

Inventive Examples 4, 5, 7, 8 and 10 and
Comparative Examples 1, 2, 3, 6, 9, 11, 12 and 13

A base moulding composition based on polymethylmethacrylate, PLEXIGLAS® 7N or PLEXIGLAS® 8N (from Evonik Industries AG, Darmstadt), was blended with one of the particular core-shell-shell particles IE1-IE3 or CE1-CE3 by means of an extruder in different ratios in the melt, the base moulding composition used corresponding in each case to the (meth)acrylic polymer II.

The constituents of each mixture were mixed vigorously by means of a tumble mixer for 3 minutes and then introduced into the funnel of a Stork single-screw extruder having screw diameter 35 mm. The components were extruded at a melt temperature of 235° C., and extrudates were drawn off from the extruder die, cooled in a water bath and chopped to give pellets of uniform grain size.

Specimens according to ISO 294 were injection-moulded using the pellets obtained in a Battenfeld BA 500 injection moulding machine. To determine the impact resistance, ISO specimens of dimensions 80 mm×10 mm×4 mm were injection-moulded at 250° C. To determine optical properties, plaques of dimensions 65 mm×40 mm×3 mm were injection-moulded at 250° C. (above melting temperature).

The compositions of the individual examples and comparative examples are documented in Table 2.

Testing of the Moulding Compositions and Specimens Produced Therefrom

The moulding compositions, i.e. the corresponding test specimens, were tested by the following test methods:

Vicat softening temperature (B50, 16 h/80° C.): DIN ISO 306 (August 1994)

Charpy impact resistance: ISO 179 (1993)

Modulus of elasticity: ISO 527-2

Transmission (D) 65/10°: DIN 5033/5036

Haze (Hazemeter BYK Gardner Hazegard-plus): ASTM D 1003 (1997)

MVR (230° C., 3.8 kg): ISO 1133

The results of the tests are shown in Table 2. The advantages of the blends according to the invention over the conventionally impact-modified moulding compositions of the comparative examples are clearly apparent. The blends according to the invention have, for example, low haze values even at relatively high temperature (80° C.), determined to ASTM D1003. The moulding compositions according to the invention also give a high impact resistance compared to the comparative examples, without any deterioration in other important properties of the moulding compositions, especially the Vicat softening temperature, the melt volume flow rate and the modulus of elasticity. Some of the values obtained in this regard are even improved over the known moulding compositions.

TABLE 1

Summary of the individual emulsions (all figures in [g])

|  | IE1 | IE2 | IE3 | CE1 | CE2 | CE3 |
|---|---|---|---|---|---|---|
| Seed latex | 15.00 | 12.00 | 5.00 | 28.00 | 5.00 | 13.00 |
| Emulsion (i) | | | | | | |
| Water | 878.70 | 878.70 | 878.70 | 878.70 | 732.69 | 732.69 |
| Sodium persulphate | 0.70 | 0.70 | 0.70 | 0.70 | 0.51 | 0.51 |
| Aerosol OT75 | 5.60 | 5.60 | 5.60 | 5.60 | 4.67 | 4.67 |
| Methyl methacrylate | 1071.62 | 1071.62 | 1071.62 | 1071.62 | 703.47 | 703.47 |
| Ethyl acrylate | 44.74 | 44.74 | 44.74 | 44.74 | 29.40 | 29.40 |
| Allyl methacrylate | 2.24 | 2.24 | 2.24 | 2.24 | 2.21 | 2.21 |
| Emulsion (ii) | | | | | | |
| Water | 606.90 | 606.90 | 606.90 | 606.90 | 628.65 | 628.65 |
| Sodium persulphate | 1.58 | 1.58 | 1.58 | 1.58 | 1.44 | 1.44 |
| Aerosol OT75 | 7.20 | 7.20 | 7.20 | 7.20 | 7.46 | 7.46 |
| Butyl acrylate | 1160.63 | 1160.63 | 1160.63 | 1160.63 | 1219.72 | 1219.72 |
| Styrene | 256.00 | 256.00 | 256.00 | 256.00 | 262.87 | 262.87 |
| Allyl methacrylate | 21.57 | 21.57 | 21.57 | 21.57 | 19.53 | 19.53 |
| Emulsion (iii) | | | | | | |
| Water | 404.30 | 404.30 | 404.30 | 404.30 | 381.56 | 381.56 |
| Sodium persulphate | 0.70 | 0.70 | 0.70 | 0.70 | 0.44 | 0.44 |
| Aerosol OT75 | 1.08 | 1.08 | 1.08 | 1.08 | 1.34 | 1.34 |
| Methyl methacrylate | 614.27 | 614.27 | 614.27 | 614.27 | 920.45 | 920.45 |
| Ethyl acrylate | 24.93 | 24.93 | 24.93 | 24.93 | 38.35 | 38.35 |

TABLE 2

Test results for the impact-modified moulding compositions (the moulding composition utilized except in IE4 was Plexiglas ® 7N; the moulding composition utilized in IE4 was Plexiglas ® 8N)

| | Comp. Ex. 1 | Comp. Ex. 2 | Comp. Ex. 3 | Inv. Ex. 4 | Inv. Ex. 5 | Comp. Ex. 6 | Inv. Ex. 7 | Inv. Ex. 8 | Comp. Ex. 9 | Inv. Ex. 10 | Comp. Ex. 11 | Comp. Ex. 12 | Comp. Ex. 13 |
|---|---|---|---|---|---|---|---|---|---|---|---|---|---|
| Core-shell-shell particles | CE1 | CE1 | IE1 | IE1 | IE1 | IE2 | IE2 | IE2 | IE3 | IE3 | CE2 | CE2 | CE3 |
| Proportion of CSS particles in moulding composition [% by wt.] | 38% | 20% | 38% | 33% | 20% | 38% | 27% | 20% | 38% | 20% | 38% | 20% | 20% |
| Particle radius [nm] | 101 | 101 | 129 | 129 | 129 | 145 | 145 | 145 | 165 | 165 | 165 | 165 | 134 |
| Moulding composition | 7N | 7N | 7N | 8N | 7N | 7N | 7N | 7N | 7N | 7N | 7N | 7N | 7N |
| Vicat [° C.] | 97.9 | 103.1 | 96.5 | 102 | 102.9 | 96.2 | 100.9 | 102.4 | 97 | 101.8 | 99.6 | 100.6 | 102.5 |
| Charpy IR at 23° C. [kJ/m²] | 91.5 | 28.4 | 114.5 | 103.9 | 63.2 | 123.6 | 105.3 | 85.3 | 130.1 | 90.9 | 95.9 | 57.4 | 34.8 |
| Light transmission [%] | 91.5 | 90.1 | 91.4 | 90.5 | 90.9 | 91.5 | 90.8 | 91.5 | 89.7 | 91.5 | 91 | 90.8 | 91.2 |
| Haze at 23° C. [%] | 0.68 | 1.6 | 1 | 0.9 | 0.6 | 1.1 | 1 | 0.9 | 2.2 | 1.2 | 1.9 | 1.5 | 0.69 |
| Haze at 80° C. [%] | 3.71 | 6.2 | 10.2 | 9.6 | 7.8 | 12.5 | 14.3 | 11.7 | 22.1 | 17.6 | 22.4 | 19.2 | 8.7 |
| Modulus of elasticity [MPa] | 1943 | 2664 | 1898 | 2071 | 2560 | 1610 | 2257 | 2610 | 1819 | 2412 | 1828 | 2384 | 2616 |
| MVR [cm³/10 min] | 1.59 | 3.28 | 1.34 | 1.57 | 3.21 | 1.4 | 2.95 | 3.58 | 1.67 | 3.39 | 1.83 | 3.47 | 3.24 |

The invention claimed is:

1. A moulding composition comprising, based in each case on the total weight thereof:
   I. 10.0% to ≤35.0% by weight, of at least one core-shell-shell particle produced or producible by a process in which
      a) water and emulsifier are initially charged,
      b) 20.0 to 45.0 parts by weight of a first composition comprising:
         A) 50.0 to 99.9 parts by weight, of alkyl methacrylates having 1 to 20 carbon atoms in the alkyl radical,
         B) 0.0 to 40.0 parts by weight, of alkyl acrylates having 1 to 20 carbon atoms in the alkyl radical,
         C) 0.1 to 10.0 parts by weight of crosslinking monomers and
         D) 0.0 to 8.0 parts by weight of styrenic monomers of the general formula (I)

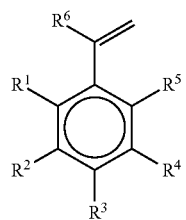

(I)

where the $R^1$ to $R^5$ radicals each independently denote hydrogen, a halogen, a $C_{1-6}$-alkyl group or a $C_{2-6}$-alkenyl group and the $R^6$ radical is hydrogen or an alkyl group having 1 to 6 carbon atoms,
are added and polymerized up to a conversion of at least 85.0% by weight, based on the total weight of components A), B), C) and D), c) 35.0 to 55.0 parts by weight of a second composition comprising:
      E) 80.0 to 100.0 parts by weight of (meth)acrylates,
      F) 0.05 to 5.0 parts by weight of crosslinking monomers and
      G) 0.0 to 25.0 parts by weight of styrenic monomers of the general formula (I)
   are added and polymerized up to a conversion of at least 85.0% by weight, based on the total weight of components E), F) and G),
   d) 10.0 to 30.0 parts by weight of a third composition comprising:
      H) 50.0 to 100.0 parts by weight of alkyl methacrylates having 1 to 20 carbon atoms in the alkyl radical,
      I) 0.0 to 40.0 parts by weight of alkyl acrylates having 1 to 20 carbon atoms in the alkyl radical and
      J) 0.0 to 10.0 parts by weight of styrenic monomers of the general formula (I)
   are added and polymerized up to a conversion of at least 85.0% by weight, based on the total weight of components H), I) and J),
   where the stated proportions by weight of compositions b), c) and d) add up to 100.0 parts by weight,
   where the relative proportions of all substances A) to J) are chosen so as to obtain core-shell-shell particles having a total radius, measured by the Coulter method, in the range of >125.0 nm and <180 nm, and
   where each polymerization in the process according to I. is conducted at a temperature in the range of >60 to <95° C.;
   II. 1.0% to 90.0% by weight, of at least one (meth)acrylic polymer,
   III. 0.0% to 45% by weight, of styrene-acrylonitrile copolymers, and
   IV. 0.0% to 10.0% by weight of further additives, where the percentages by weight of components I) to IV) add up to 100.0% by weight and where II., or the mixture of II., III. and/or IV., is chosen such that it has a refractive index which, when measured according to ISO 489 (Method A), differs by not more than 0.01 unit from the refractive index of I, wherein the moulding composition has
a. a Charpy impact resistance to ISO 179 of at least 40.0 kJ/m² at 23° C.,
b. a haze to ASTM D 1003 (1997) of ≤3% at 23° C. and a haze to ASTM D 1003 (1997) of ≤21% at 80° C.,
c. a Vicat softening temperature to DIN ISO 306 (August 1994) of ≥98° C., and
d. a melt volume flow rate MVR to ISO 1133 (230° C.; 3.8 kg) of ≥1.5 cm³/10 min.

2. The moulding composition according to claim 1, wherein the second composition of the core-shell-shell particle according to I. comprises, as G), more than 8.0 and up to 19.95 parts by weight, of styrenic monomers of the general formula (I).

3. The moulding composition according to claim 1, wherein the second composition of the core-shell-shell particle according to I. has a Tg of <−10° C.

4. The moulding composition according to claim 1, wherein, in the process for obtaining I., the polymerization in steps b) to d) is initiated using a peroxodisulphate.

5. The moulding composition according to claim 1, wherein the at least one (meth)acrylic polymer according to II. comprises, based in each case on the total weight thereof:
   a) 52.0% to 100.0% by weight of repeat alkyl methacrylate units having 1 to 20 carbon atoms in the alkyl radical,
   b) 0.0% to 40.0% by weight of repeat alkyl acrylate units having 1 to 20 carbon atoms in the alkyl radical and
   c) 0.0% to 8.0% by weight of repeat styrenic units of the general formula (I),
   where the percentages by weight add up to 100.0% by weight.

6. The moulding composition according to claim 1, wherein the at least one (meth)acrylic polymer according to II., based in each case on the total weight thereof, contains ≤8% by weight of repeat alkyl acrylate units having 1 to 20 carbon atoms in the alkyl radical.

7. The moulding composition according to claim 1, wherein the moulding composition comprises styrene-acrylonitrile copolymers according to III., the styrene-acrylonitrile copolymers having been obtained by polymerizing a mixture consisting of 70% to 92% by weight of styrene,
8% to 30% by weight of acrylonitrile and
0% to 22% by weight of further comonomers, based in each case on the total weight of the mixture.

8. The moulding composition according to claim 1, wherein the moulding composition, based on the total weight thereof, comprises 0.1% to 10.0% by weight of a further polymer as additive according to IV., having a weight-average molecular weight at least 10% higher compared to the at least one (meth)acrylic polymer according to II.

9. A moulding article obtained from a moulding composition according to claim 1, wherein the moulded article has
a. a Charpy impact resistance to ISO 179 of at least 40.0 kJ/m² at 23° C.,
b. a haze to ASTM D 1003 (1997) of ≤3% at 23° C., and a haze to ASTM D 1003 (1997) of ≤21% at 80° C.,
c. a Vicat softening temperature to DIN ISO 306 (August 1994) of ≥98° C., and
d. a melt volume flow rate MVR to ISO 1133 (230° C., 3.8 kg) of ≥1.5 cm³/10 min.

10. The article according to claim 9, which is selected from the group consisting of
large and/or thin-walled impact-resistant components; glass panes/glazing; displays for communication devices; tablet PCs; TV devices; kitchen appliances and other electronic devices; building interior lighting and exterior lighting.

11. The article according to claim 9, which is selected from the group consisting of an impact-modified and large and/or thin-walled injection-moulded component; glass panes/glazing; coloured glass covers for automobile lights; a display for a communication device; a TV device; a tablet PC; a kitchen appliance another electronic device; building interior lighting and exterior lighting.

12. The moulding composition according to claim 1, wherein the relative proportions of all substances A) to J) are chosen so as to obtain core-shell-shell particles having a total radius, measured by the Coulter method, in the range of >125.0 nm and <150 nm.

13. The moulding composition according to claim 1, wherein the relative proportions of all substances A) to J) are chosen so as to obtain core-shell-shell particles having a total radius, measured by the Coulter method, in the range of >125.0 nm and <145 nm.

14. The moulding composition according to claim 4, wherein the peroxodisulphate is at least one selected from the group consisting of ammonium peroxodisulphate and alkali metal peroxodisulphate.

* * * * *